April 2, 1929. E. A. SOHL Re. 17,254

END AND CORNER BUMPER

Original Filed Jan. 21, 1924 2 Sheets-Sheet 1

Inventor
Edgar A. Sohl

By Hull, Brock & West
Attys.

April 2, 1929. E. A. SOHL Re. 17,254
END AND CORNER BUMPER
Original Filed Jan. 21, 1924 2 Sheets-Sheet 2
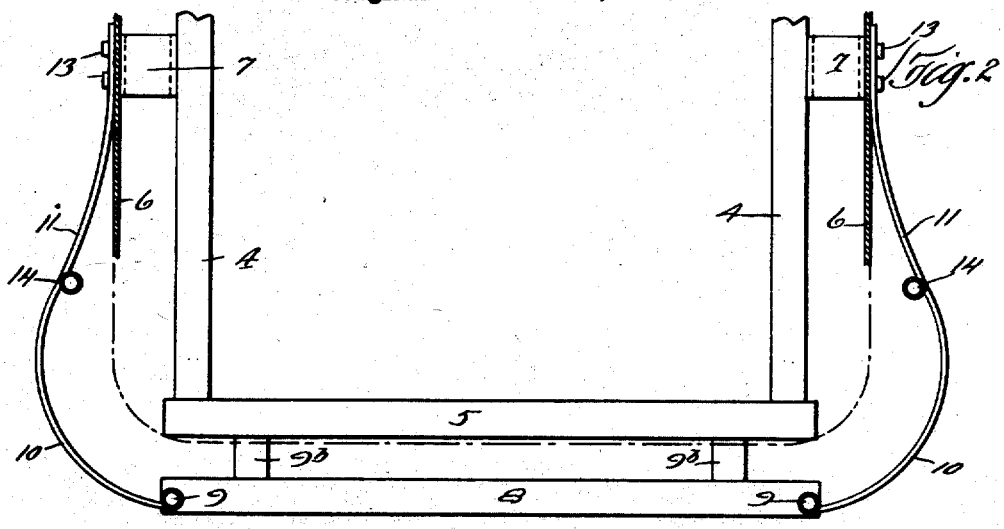
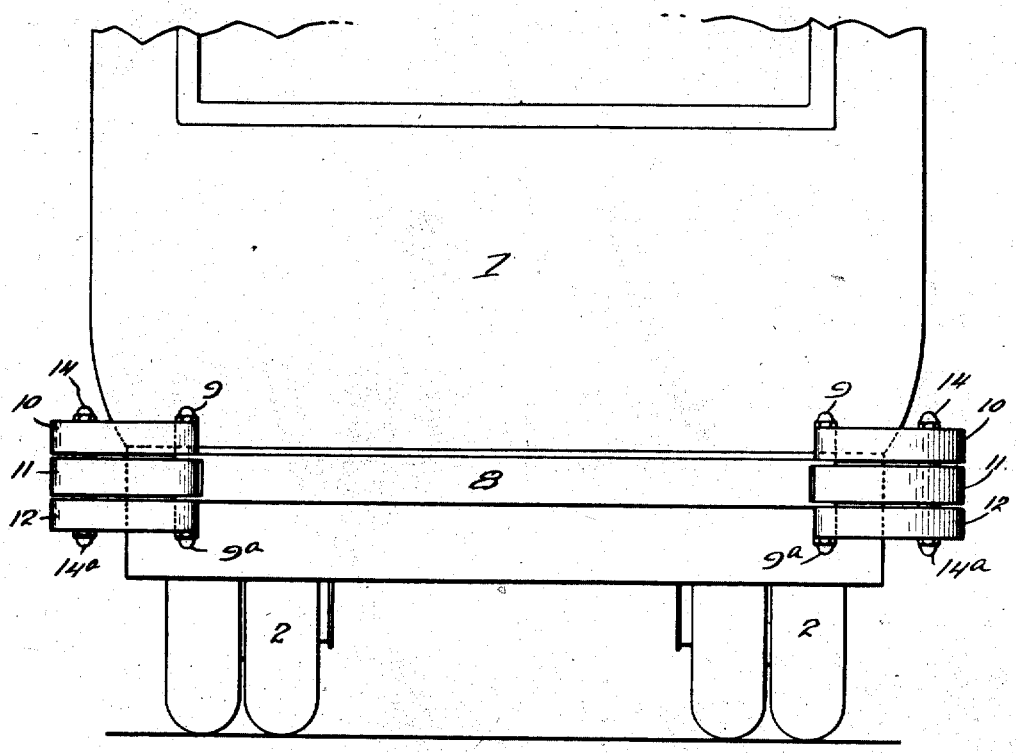
Fig. 3
Inventor
Edgar A. Sohl
By Hull, Brock & West,
Attys.

Reissued Apr. 2, 1929. Re. 17,254

UNITED STATES PATENT OFFICE.

EDGAR A. SOHL, OF CLEVELAND, OHIO, ASSIGNOR TO C. G. SPRING & BUMPER COMPANY, OF DETROIT, MICHIGAN, A CORPORATION OF DELAWARE.

END AND CORNER BUMPER.

Original No. 1,546,947, dated July 21, 1925, Serial No. 687,448, filed January 21, 1924. Application for reissue filed July 21, 1927. Serial No. 207,549.

This invention relates to bumpers, and more particularly to combined end and corner bumpers for the rear ends of large and heavy automobiles of the "bus" type.

It is a general object of the invention to provide a bumper which will be capable of adequately protecting the rear and the corners of vehicles of this type. Further and more limited objects of the invention will appear hereinafter and will be realized in and through the combinations of elements embodied in the claims hereto annexed.

Figure 1:
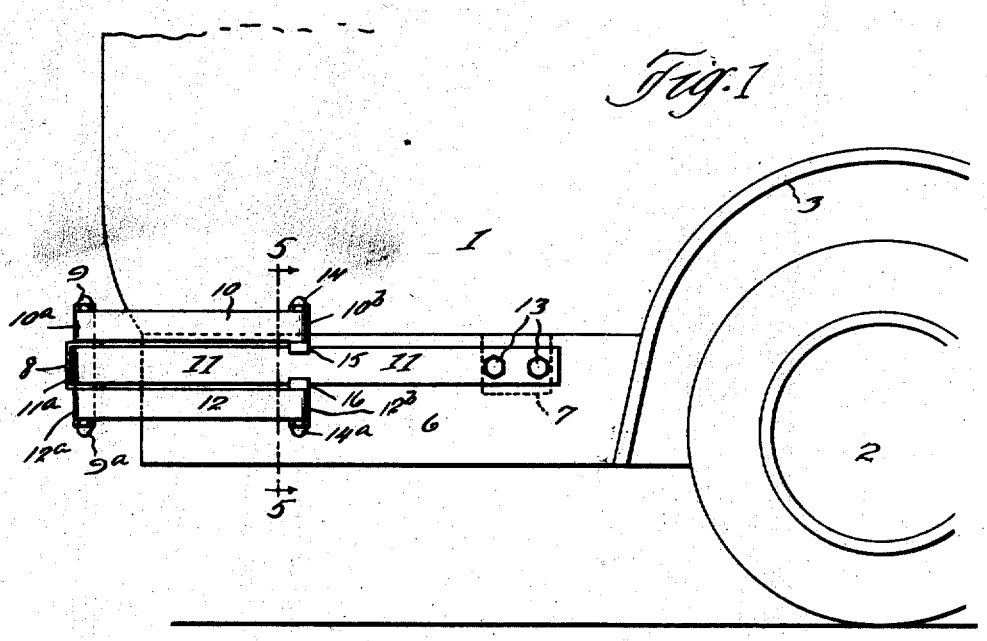
Figure 4:
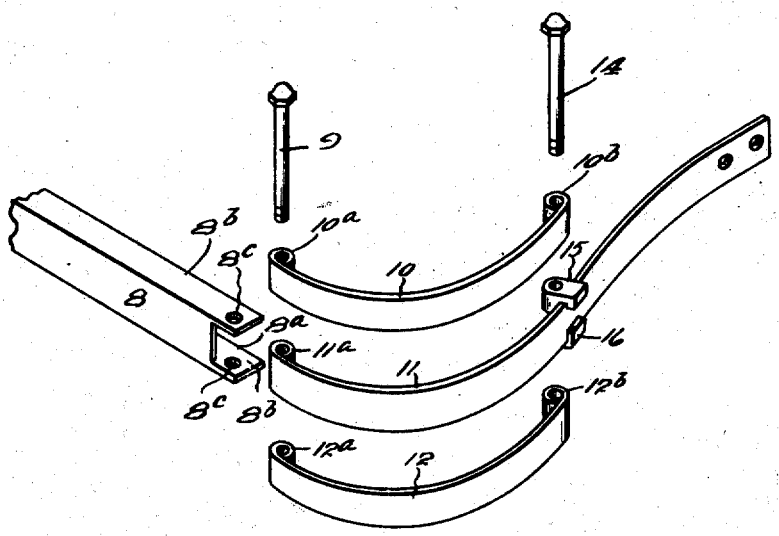
Figure 5:
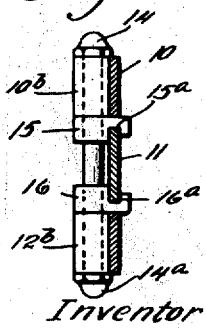

In the drawings, Fig. 1 represents a side elevation of the rear portion of a vehicle of the type referred to, having my invention applied thereto; Fig. 2, a sectional plan view of the rear portion of such vehicle; Fig. 3, a rear end elevation of the vehicle shown in Fig. 1; Fig. 4, a detail in perspective showing the end of the rear bumper and the parts of the corner guard cooperating therewith; and Fig. 5, a sectional detail corresponding to the line 5—5 of Fig. 1.

Describing the parts by reference characters, 1 represents the rear end of a vehicle of the "bus" type, 2 the rear wheels thereof, and 3 one of the rear fenders. 4, 4 denote the rear portions of a pair of side members, and 5 the rear cross member connecting the ends of the side members. 6 denotes a skirt, or metal sheathing, below the body 1 and enclosing rear portions of the members 4 and the cross member 5, being spaced from the former members by means of blocks 7.

The complete rear bumper and corner guard construction comprises a channeled bumper bar 8 which is mounted on the rear ends of short posts $9^b$ projecting from the rear member 5 through the rear part of the skirt 6. The bumper member 8 is preferably of the same length as the cross member 5, extending nearly as far as the side portions of the skirt 6. Adjacent each end, the web of the member 8 is cut away, as indicated at $8^a$ (Fig. 4), and the flanges $8^b$, which extend beyond the web, are provided with vertically aligned apertures $8^c$. 9 denotes a pair of bolts, each mounted in the apertures $8^c$ at each end of the member 8 and extending above and below such member, when assembled. Each bolt extends through vertically aligned eyes $10^a$, $11^a$ and $12^a$ on the ends of the curved resilient bars 10, 11 and 12, respectively, the eye $11^a$ being located between the flanges $8^b$, the eye $10^a$ above the member 8, and the eye $12^a$ below the member 8.

The bar 11 extends forwardly along the skirt 6 and is secured at its front end to the corresponding block 7, as by wood bolts or screws 13.

The bars 10 and 12 extend forwardly a sufficient distance to protect the corners of the vehicle body. Each is provided at its front end with an eye, indicated at $10^b$ and $12^b$, respectively, the eyes and the front ends of the bars being secured to the bar 11 by means of a bolt 14 extending through the eyes $10^b$ and $12^b$ and through a pair of clamping members 15 and 16, having seats $15^a$ and $16^a$, respectively, for the upper and the lower edge of the bar 11. The bolts 9 and 14 will be provided with nuts $9^a$ and $14^a$, respectively.

By the construction disclosed herein, the major portion of the rear end of the vehicle will be protected by the channeled bumper bar 8; the corners by the resilient triple-bar bumpers formed by the bars 10, 11 and 12; while the sides of the skirts 6 beyond the corners will be protected by the single bars 11.

The curved resilient bar 11, connected at its rear end to the bar 8 and at its forward end to the side of the vehicle, and reinforced by the bars 10 and 12 in vertical alignment above and below a portion of the same, provides a corner bumper having an arched construction which will give the maximum resistance to blows delivered from any angle and directed towards the corner of the vehicle.

Having thus described my invention, what I claim is:

1. The combination, with a channel bar extending transversely at the rear of a vehicle, of a resilient curved bar having an eye interposed between and secured to the flanges of the first-mentioned bar and extending around a corner of the vehicle and secured to the vehicle at a point remote from the first-mentioned bar, an upper and a lower curved resilient bar each having an eye at the end thereof, a bolt extending through the eyes of the three bars and securing the same to the first-mentioned bar, and means for securing the opposite ends of the third and fourth bars to the second bar.

2. A corner guard for a vehicle comprising an intermediate curved resilient bar having an eye at its rear end, means for securing the front end of said bar to such vehicle, an upper and a lower curved resilient bar each having an eye at the rear end thereof and an eye at the front end thereof, a bolt extending through the eyes at the rear ends of the three bars, and means including a bolt extending through the eyes at the front ends of the second and third bars for securing the same to the first-mentioned bar.

3. The combination, with a channel bar extending transversely at the rear of a vehicle, of a resilient curved bar having an eye interposed between the flanges of the first-mentioned bar and extending around a corner of the vehicle and secured to the vehicle at a point remote from the first-mentioned bar, and means for securing the said eye to the said flanges of the channel bar.

4. The combination, with a bar extending transversely at the rear of a vehicle, of a resilient curved attaching bar secured to each end of the first-mentioned bar and each extending around the corner of a vehicle and secured to such vehicle and each having an eye at its rear end, an upper and a lower curved resilient corner-guard bar at each side of the bumper, and each having an eye at the rear end thereof and an eye at the front end thereof, bolts extending through the eyes at the rear ends of the attaching and corner-guard bars, and means including bolts extending through the eyes at the front ends of the corner-guard bars for securing the same to the cooperating attaching bars.

5. The combination, with a channel bar extending transversely at the rear of a vehicle, of a resilient curved bar having an eye interposed between and secured to the flanges of the channel bar and extending around a corner of the vehicle and secured to the vehicle at a point remote from the channel bar, an upper and a lower curved resilient bar each connected at its rear end to the channel bar, and means for supporting the front ends of the last two resilient bars from the vehicle.

6. The combination, with a transversely extending bar at the rear of a vehicle, of a resilient curved bar connected to each end of the first mentioned bar and each extending about a corner of the vehicle and each secured to the vehicle at a point remote from the first mentioned bar, and an upper and a lower curved resilient bar each secured at its rear end to the first mentioned bar and each having its front end secured to the cooperating second bar intermediate of the ends of the latter.

7. The combination with a transversely extending bar at the rear of a vehicle, of a resiliently curved bar connected to each end of the first mentioned bar and each extending about a corner of the vehicle and each secured to the vehicle at a point remote from the first mentioned bar, and an upper and a lower curved resilient bar each secured at its rear end to one of the second mentioned bars and each having its front end secured to the cooperating second mentioned bar intermediate of the ends of the latter.

8. The combination, with a corner of a vehicle, of an attaching bar connected at one end to such vehicle and reversely curved to extend about and beyond such corner, and a pair of corner-guard bars additional to the attaching bar and supported respectively above and below the attaching bar in position to protect the said vehicle corner.

9. The combination, with a corner of a vehicle, of an attaching bar connected at one end to such vehicle and reversely curved to extend about and beyond such corner, a pair of corner-guard bars additional to the attaching bar and located respectively above and below the attaching bar, means supporting the inner ends of said corner-guard bars, and means for supporting the outer ends of all of said bars from the vehicle.

10. The combination, with a corner of a vehicle, of an attaching bar connected at one end to such vehicle and extending about and beyond such corner, a pair of corner-guard bars additional to the attaching bar and located respectively above and below the attaching bar, means supporting the inner ends of said corner-guard bars from the attaching bar, means supporting the outer ends of the corner-guard bars from the attaching bar, and means for supporting the outer ends of all of said bars from the vehicle.

11. The combination, with a vehicle, of a bumper comprising a pair of attaching bars each secured at its inner end to a side of such vehicle and extending about and beyond a corner thereof, a pair of corner-guard bars for each attaching bar and each supported at its inner end by an attaching bar and each also extending about a corner of the vehicle, and an impact bar interposed between the opposed outer ends of the attaching bars and corner-guard bars and connected at its ends to the outer ends of the attaching bars.

12. A bumper comprising in combination outwardly and rearwardly extending attaching bars having their front or inner ends adapted for attachment to a vehicle and provided each at its rear or outer end with an eye, an upper and a lower corner-guard bar for each attaching bar and each having an eye at its rear or outer end adapted to align with the eye in the corresponding end of the said attaching bar, bolts extending through such aligned eyes, each corner-guard bar having an eye at its inner end, bolts extending through the aligned eyes at the inner ends of each pair of corner-guard bars, and clamps on each bolt adapted to engage the portion of the corresponding attaching bar which is interposed between such eyes.

13. A corner guard for a vehicle, said guard including a resilient bar adapted to be attached at its forward end portion to the vehicle and bent to form a reversely curved arch extending from a point in front of the end of the vehicle around and to the rear of the corner thereof, and means for supporting the rear end of said bar from the vehicle.

14. A corner guard for a vehicle, said guard including a bar adapted to be attached at its forward end portion to the vehicle and bent to form an outwardly bowed arch extending from a point in front of the end of the vehicle around and to the rear of the corner thereof, impact bars attached at their rear end portions to the rear end portion of the first mentioned bar and at their forward end portions to an intermediate portion of the said first mentioned bar, and means for supporting the rear ends of said bars from the vehicle.

15. A corner guard for a vehicle, said guard including a bar adapted to be attached at its forward end portion to the vehicle and bent to form a reversely curved arch extending from a point in front of the end of the vehicle around and to the rear of the corner thereof, impact bars attached to said attaching bars and in vertical alignment therewith, and means for supporting the rear ends of said bars from the vehicle.

16. In a vehicle bumper the combination of a pair of corner guards, each of said guards including a resilient bar adapted to be attached at its forward end portion to the vehicle and bent to form a reversely curved arch extending from a point in front of the end of the vehicle around and to the rear of the corner thereof, an intermediate impact section connected to the two corner guards, and means for supporting the intermediate portion of the bumper.

17. A corner guard for a vehicle, said guard including a pair of bars with their inner ends substantially parallel to the body of the vehicle and being adapted to extend around the corner of a vehicle and provide an outwardly bowed arched impact portion to protect the same, means for supporting said bars at their forward end portions from the side of the vehicle, and means for supporting the rear end portions of said bars from the end of the vehicle.

18. The combination, with an end portion of a vehicle, of a bumper for each corner of such end, each bumper comprising a bar having an end substantially parallel to and supported from a side of such end portion said bar having a portion reversely curved to extend about the adjacent portion of the end and supported by and in spaced relation from such end portion, the rear ends of the said bars being presented toward and spaced from each other.

19. The combination, with an end portion of a vehicle, of a bumper comprising a reversely curved arched corner bumper extending around each corner of the vehicle and each supported in spaced relation with respect thereto, the outer ends of the said corner bumpers extending beyond the ends of the sides of the vehicle, and a central bumper section connected to the opposed ends of the corner bumpers.

20. In a vehicle bumper, the combination of a central impact section adapted to protect the rear of a vehicle, corner impact sections attached to said central impact section and bent forwardly and inwardly to provide reversely curved bowed guards for corners of said vehicle, and means for supporting the end and intermediate portions of said bumper from said vehicle.

21. A vehicle bumper comprising a central impact section adapted to protect an end of a vehicle, corner impact sections pivotally attached to said central impact section, said corner sections being bent forwardly and inwardly to provide reversely curved bowed corner guards, and means for supporting the end and central portions of the bumper from the vehicle.

22. A corner guard for a vehicle comprising a support bar supported at one end from a side of the vehicle and at the other end from an end thereof, an impact bar adapted to extend about the adjacent corner and supported at one end from said support bar at a point intermediate its ends.

23. A corner guard for a vehicle comprising a support bar supported at one end from a side of the vehicle and at its other end from an end thereof, a pluraltiy of impact bars arranged above and below said support bar and connected to said support bar intermediate its ends.

24. A corner guard for a vehicle comprising a bar having one end extending substantially parallel to the side of the vehicle and adapted to be supported therefrom, said bar having its outer end portion bowed outwardly from said first-mentioned portion and having its outer end supported from the vehicle.

25. A corner guard for a vehicle comprising a bar having one end extending substantially parallel to the side of the vehicle and adapted to be supported therefrom, said bar having its outer end portion bowed outwardly from said first-mentioned portion and having its outer end supported from the vehicle, and a plurality of impact bars supporting on said first-mentioned bar and adapted to extend about the adjacent corner of the vehicle.

26. A corner guard comprising a resilient bar having its forward end substantially parallel to a side of a vehicle and its rear end portion extending substantially parallel to an end of said vehicle and having the portion intermediate its end bowed outwardly to form an arched protection for the said corner.

27. A vehicle bumper comprising a central impact section adapted to protect an end of the vehicle, and corner guard sections attached thereto, said corner guards including bars having their inner ends substantially parallel to the body of the vehicle and having their rear end portions bent outwardly and inwardly to form outwardly bowed arched guards adapted to protect the adjacent corner of the vehicle.

28. A vehicle bumper comprising a central impact section adapted to protect an end of the vehicle and corner guard sections attached thereto, said corner guards including bars having their forward ends substantially parallel to the body of the vehicle and having their rear end portions bent outwardly and inwardly to form arched guards of substantially even curvature, said corner guards being pivotally connected to the central impact section.

In testimony whereof I hereunto affix my signature.

EDGAR A. SOHL.